(12) United States Patent
Koo et al.

(10) Patent No.: US 10,471,419 B2
(45) Date of Patent: Nov. 12, 2019

(54) METHOD FOR FORMING METAL OXIDE COATING LAYER ON CATALYST SUBSTRATE, CATALYST SUBSTRATE INCLUDING METAL OXIDE COATING LAYER AND CATALYST APPARATUS

(71) Applicant: KOREA INSTITUTE OF ENERGY RESEARCH, Daejeon (KR)

(72) Inventors: Kee Young Koo, Daejeon (KR); Wang Lai Yoon, Daejeon (KR); Un Ho Jung, Daejeon (KR); Hyun Ji Eom, Daejeon (KR); Soon Chul Kwon, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 15/131,553

(22) Filed: Apr. 18, 2016

(65) Prior Publication Data

US 2017/0197202 A1 Jul. 13, 2017

(30) Foreign Application Priority Data

Jan. 13, 2016 (KR) .................. 10-2016-0004082

(51) Int. Cl.
| | | |
|---|---|---|
| B01J 37/03 | (2006.01) | |
| B01J 21/04 | (2006.01) | |
| B01J 23/86 | (2006.01) | |
| B01J 35/00 | (2006.01) | |
| B01J 37/08 | (2006.01) | |
| B01J 37/34 | (2006.01) | |

(52) U.S. Cl.
CPC ............ *B01J 37/035* (2013.01); *B01J 21/04* (2013.01); *B01J 23/862* (2013.01); *B01J 35/002* (2013.01); *B01J 35/0006* (2013.01); *B01J 37/038* (2013.01); *B01J 37/08* (2013.01); *B01J 37/348* (2013.01)

(58) Field of Classification Search
CPC ........ B01J 37/035; B01J 21/04; B01J 23/862; B01J 35/0006; B01J 37/08; B01J 37/348; B01J 35/002
See application file for complete search history.

(56) References Cited

U.S. PATENT DOCUMENTS 6,540,968 B1 * 4/2003 Huang ................ B01D 53/945
423/213.5
2010/0261600 A1 10/2010 Yoon et al.

FOREIGN PATENT DOCUMENTS

| GB | 832200 | * 4/1960 |
| JP | 10-202101 A | 8/1998 |
| KR | 10-2010-0113740 A | 10/2010 |
| KR | 10-1019234 B1 | 2/2011 |

* cited by examiner

*Primary Examiner* — James A Fiorito
(74) *Attorney, Agent, or Firm* — Birch, Stewart, Kolasch & Birch, LLP

(57) ABSTRACT

An embodiment of the present invention provides a method for forming a metal oxide coating layer on a catalyst support, which comprises a precipitation step for forming a metal-containing precipitate on the catalyst support by contacting the catalyst support with a mixed solution containing a metal oxide precursor and a precipitant, and a calcination step for calcinating the metal-containing precipitate produced on the catalyst support to produce the metal oxide coating layer on the catalyst support.

15 Claims, 7 Drawing Sheets

METHOD FOR FORMING METAL OXIDE COATING LAYER ON CATALYST SUBSTRATE, CATALYST SUBSTRATE INCLUDING METAL OXIDE COATING LAYER AND CATALYST APPARATUS

CROSS-REFERENCE TO RELATED APPLICATION

This application claims priority to and the benefit of Korean Patent Application No. 10-2016-0004082, filed on Jan. 13, 2016, the disclosure of which is incorporated herein by reference in its entirety.

BACKGROUND OF THE INVENTION

Field of the Invention

This invention relates to a method for forming a metal oxide coating layer on a catalyst support. More particularly, this invention relates to a method for forming a metal oxide catalyst carrier on the surface of the catalyst support, wherein the catalyst carrier is produced by forming a metal-containing precipitate on the surface of the catalyst support and calcinating the precipitate.

Description of the Related Art

A catalyst reactor has been used in devices for posttreatment of the exhaust gases from vehicles, and in various chemical processes such as hydrogen production and desulfurization. The catalyst reactor is constructed to carry catalysts such as nickel, ruthenium, platinum, palladium, rhodium, etc. in a catalyst carrier formed on the surface of a catalyst support.

The catalyst support is usually made of a ceramic or metal, and configured to form a passage of reactants flowing through the catalyst reactor. The catalyst support may be variously fabricated in a form of felt, mat, mesh, foam, foil, monolith, or pin. The catalyst carrier is formed by coating a ceramic such as alumina, boehmite, silica, titania, etc. on the surface of the catalyst support, and functions as a carrier of the catalysts.

Since the catalyst reactor is normally used at a high temperature, the catalyst carrier may be detached from the catalyst support due to the difference of thermal expansion coefficients between the support and the carrier, which results in deteriorating durability and efficiency of the catalyst reactor. Therefore, it matters to increase the binding force between the support and the carrier. Further, it matters to increase the specific surface area of the carrier for enhancing a possibility of dispersedly carrying the catalysts and contacting the catalysts with the reactants, which results in improved catalytic activity and conversion efficiency.

Korean Patent No. 10-1019234 (Patent Literature 1) discloses a method of preparing a metal support in a compact reformer for increasing a binding force between a catalyst carrier and a catalyst support, and a specific surface area of the carrier. The method comprises the steps of electrochemical surface treatment for a metal catalyst support to form an amorphous metal oxide layer on the metal support by controlling an applied voltage and an electrolyte concentration, and heat treatment for the electrochemically surface-treated metal support in a heating furnace under an oxidation atmosphere to crystallize the amorphous metal oxide layer formed on the metal support or to form a metal oxide layer containing a specific metal component. Patent Literature 1 employs the metal oxide on the metal support, or another carrier layer coated on the metal oxide as a catalyst carrier.

FIG. 1 is schematic views showing catalyst carriers produced by Patent Literature 1, in which a catalyst is loaded in the carriers.

Referring to FIG. 1, FIG. 1(a) is a schematic view which shows a metal oxide 20 formed on a catalyst support 10 after electrochemical surface treatment and heat treatment. The metal oxide 20 is used as a catalyst carrier and the catalyst 30 is directly loaded on the metal oxide 20.

We found that the binding force between the catalyst 30 and the metal oxide 20, and catalytic activity were not high when the catalyst 30 was directly loaded on the metal oxide 20 formed on the catalyst support after electrochemical surface treatment and heat treatment, as shown in FIG. 1(a).

FIG. 1(b) is a schematic view which shows the metal oxide 20 formed on the catalyst support 10 after electrochemical surface treatment and heat treatment, and another carrier layer 40 coated on the metal oxide 20. Such construction is intended to solve the problem that the binding force between the catalyst 30 and the metal oxide 20 and catalytic activity deteriorate when the catalyst 30 is directly loaded on the metal oxide 20. FIG. 1(b) shows that the catalyst 30 is loaded on the carrier layer 40.

As shown in FIG. 1(b), when the catalyst 30 is loaded on the carrier layer 40 formed on the metal oxide 20, the binding force between the carrier layer 40 and the catalyst 30 is improved and, therefore, the catalytic activity is increased.

However, the surface of the carrier layer 40 is relatively rough and, therefore, its specific surface area is not high, because Patent Literature 1 forms the carrier layer 40 on the metal oxide 20 by spraying, impregnation, washcoating, etc. Further, we found that the carrier layer 40 was occasionally detached from the catalyst support 10, because the carrier layer 40 and the catalyst support 10 were physically bonded.

SUMMARY OF THE INVENTION

An object of the present invention is to provide a method for forming a metal oxide coating layer as a catalyst carrier on a catalyst support so that the binding force between the metal oxide coating layer and the catalyst support, and the specific surface area of the metal oxide coating layer are increased.

The objects of the present invention are not confined to the above object. One of ordinary skill in the art may appreciate other unmentioned objects of the present invention from the following description.

In order to achieve the above objects, the present invention provides a method for forming a metal oxide coating layer on a catalyst support, which comprises precipitation step for forming a metal-containing precipitate on the catalyst support by contacting the catalyst support with a mixed solution containing a metal oxide precursor and a precipitant, and calcination step for calcinating the metal-containing precipitate produced on the catalyst support to produce the metal oxide coating layer on the catalyst support.

According to the present invention, the metal oxide coating layer may be an alumina oxide coating layer and the metal is aluminum.

According to the present invention, the metal containing precipitate may be boehmite ($AlO(OH)$) or bayerite ($Al(OH)_3$).

According to the present invention, the metal oxide coating layer may be formed in a configuration in which a plurality of round particles or needle-shaped particles is closely packed.

According to the present invention, the metal oxide precursor may be one or more kinds selected from the group consisting of aluminum nitrate ($Al(NO_3)_3 \cdot 9H_2O$), aluminum chloride ($AlCl_3 \cdot 6H_2O$), and aluminum acetate ($C_2H_5AlO_4$).

According to the present invention, the precipitant may be ammonia ($NH_3$) and/or urea ($CO(NH_2)_2$).

According to the present invention, the metal oxide precursor in the mixed solution may have a concentration ranging from 50 to 2000 mM.

According to the present invention, the mixed solution may have a pH ranging from 3 to 12.

According to the present invention, the precipitation step may be performed at a temperature of from 25 to 200° C. for 0.5 to 100 hours.

According to the present invention, the precipitation step may preferably be performed at a temperature of from 60 to 90° C. for 5 to 70 hours.

According to the present invention, the calcination step may be performed at a temperature of from 500 to 1200° C. under an oxidizing atmosphere.

According to the present invention, the calcination step may preferably be performed at a temperature of from 700 to 900° C. under an oxidizing atmosphere.

According to the present invention, electrochemical surface treatment for the catalyst support and/or heat treatment for the catalyst support may be performed before the precipitation step.

According to the present invention, the catalyst support may be made from a material selected from the group consisting of stainless steel, a FeCr alloy, aluminum, titanium, and SiC, or an alloy made from two or more materials selected from the group.

According to the present invention, the catalyst support may be fabricated in a form of felt, mat, mesh, foam, foil, monolith, or pin.

In order to achieve the above objects, the present invention provides a catalyst support comprising the metal oxide coating layer produced by the aforementioned method.

In order to achieve the above objects, the present invention provides a catalyst reactor comprising the aforementioned catalyst support, wherein the metal oxide coating layer carries a catalyst.

DETAILED DESCRIPTION OF THE PREFERRED EMBODIMENTS

Figure 1:
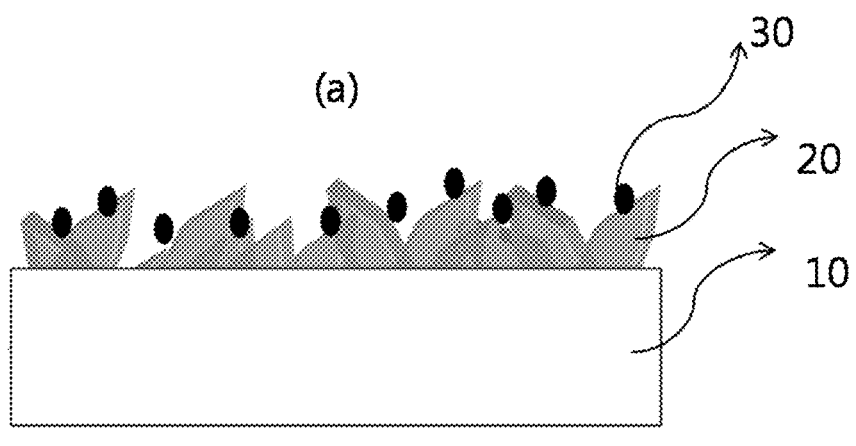
FIG. 1 is schematic views showing catalyst carriers produced by Patent Literature 1, in which a catalyst is loaded in the carriers.
Figure 1:
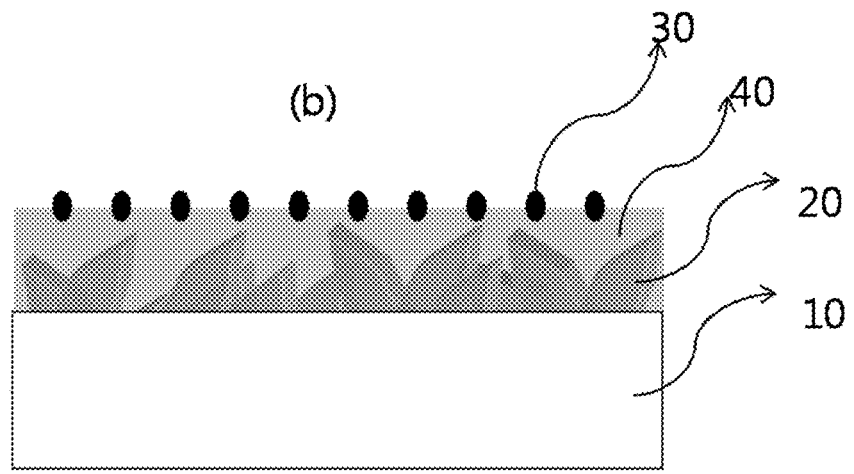

Hereafter, the preferred embodiments of the present invention will be described with reference to the accompanying drawings. However, the present invention is not confined to the following embodiments since it may be embodied in a variety of forms. Further, in order to clearly present the concept of the present invention, elements unrelated to the description of the present invention are omitted in the drawings in which like reference numerals refer to like parts.

In this specification, when it is said that two parts are connected (joined, contacted, or bonded), it includes an "indirectly connected" case in which an intermediate part is placed between the two parts, in addition to a "directly connected" case. Further, when it is said that a matter "comprises" a list of elements, the matter may include another elements. That is, it is not intended to exclude additional elements, if there is no explicitly exclusive expression.

The terms used in the present specification are intended to explain specific embodiments, not to confine the present invention. Singular forms may contain plural meaning unless apparently indicating singular meaning in the context. In the present specification, the terms "comprise," "comprising," "have," "having," or any other variation thereof are intended to express that a list of specified features, numerals, steps, actions, elements, components or combinations thereof exist, not to exclude additional features, etc. or a possibility of adding any other features, etc., to the listed features, etc.

The preferred embodiments of the present invention will be hereafter described with reference to the accompanying drawings.

Figure 2:
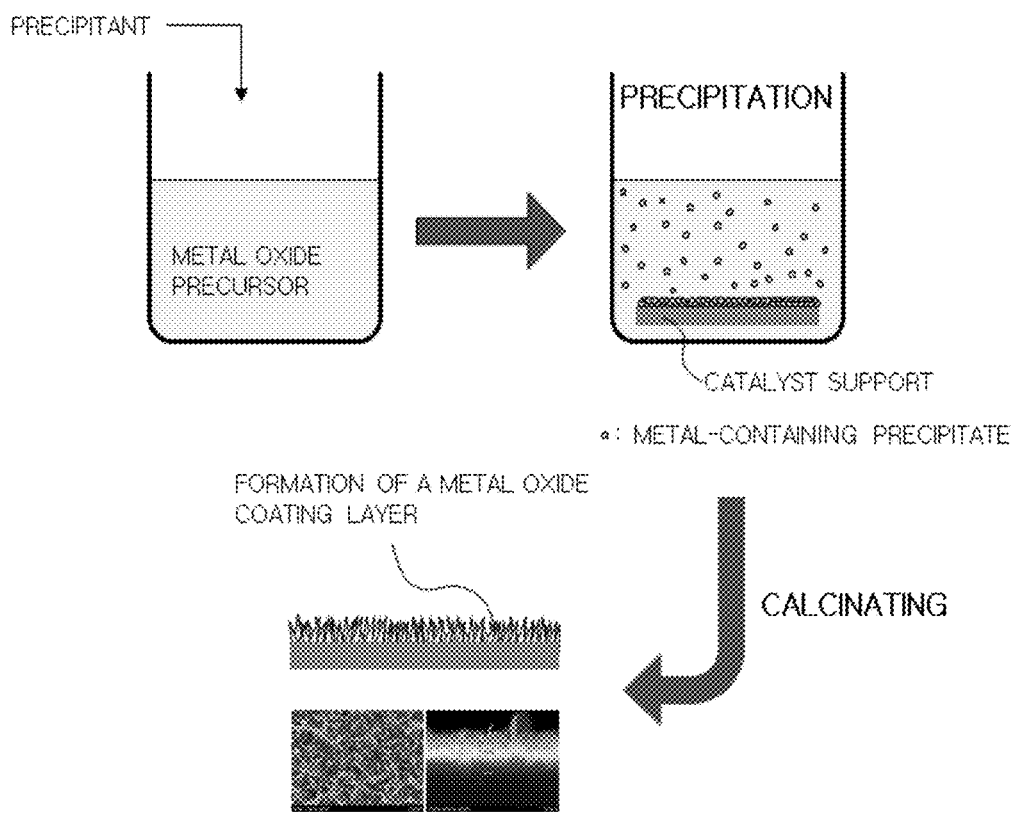
FIG. 2 is a schematic view representing a method for forming a metal oxide coating layer on a catalyst support according to the present invention.

FIG. 2 is a schematic view representing a method for forming a metal oxide coating layer on a catalyst support according to the present invention.

Referring to FIG. 2, the method of the present invention comprises a precipitation step and a calcination step.

The precipitation step is a step which produces a metal-containing precipitate on a catalyst support by contacting the catalyst support with a mixed solution containing a metal oxide precursor and a precipitant.

The metal oxide precursor is a chemical compound of a preceding stage to produce a metal oxide. For example, an alumina precursor for producing alumina ($Al_2O_3$) as an aluminum oxide includes aluminum nitrate ($Al(NO_3)_3 \cdot 9H_2O$), aluminum chloride ($AlCl_3 \cdot 6H_2O$), and aluminum acetate ($C_2H_5AlO_4$). One or more among these precursors may be selected as the alumina precursor.

It is preferable that the concentration of the metal oxide precursor in the mixed solution is in a range of 50 to 2000 mM.

The precipitant is a reaction material producing an insoluble solid, that is, a precipitate from soluble ion state materials by an exchange reaction. For example, KOH, NaOH, ammonia ($NH_3$), urea ($CO(NH_2)_2$), $Na_2CO_3$, $K_2CO_3$, etc. are used as the precipitant.

The mixed solution is obtained by mixing the metal oxide precursor and the precipitant in a liquid solvent such as water (distilled water) etc. The mixed solution may be obtained by simultaneously mixing both of the metal oxide precursor and the precipitant in the liquid solvent, or by supplying a mixture of the metal oxide precursor and the liquid solvent with the precipitant at a constant rate.

The pH of the mixed solution to produce the precipitate may be varied depending on the kind of the metal oxide to be formed as the metal oxide coating layer. The pH of the mixed solution is preferably in a range of 3 to 12. The size and shape of metal oxide particles may be controlled by varying the pH of the mixed solution, depending on the amount or concentration of the precipitant to be used.

The catalyst support can be made from a material selected from the group consisting of stainless steel, a FeCr alloy, aluminum, titanium, and SiC, or an alloy made from two or more materials selected from the group. However, a material being selected as the catalyst support is not limited to the above materials. Further, though the catalyst support may be fabricated in a form of felt, mat, mesh, foam, foil, monolith, or pin, it is also not limited to the above mentioned one.

As shown in FIG. 2, in the precipitation step, the metal-containing precipitate is precipitated on the catalyst support by contacting the catalyst support with the mixed solution containing the metal oxide precursor and the precipitant. For example, the metal-containing precipitate may be boehmite (AlO(OH)) or bayerite (Al(OH)$_3$). An alumina coating layer is produced on the catalyst support by calcinating boehmite particles precipitated on the catalyst support.

An operating temperature and time in the precipitation step to produce precipitate particles on the catalyst support by contacting the catalyst support with the mixed solution are varied depending on the kind of the precipitant, and the concentration and amount of the metal oxide precursor. It is preferable that the temperature is from 25 to 200° C. and the time is from 0.5 to 100 hours. It is more preferable that the temperature is from 60 to 90° C. and the time is from 5 to 70 hours.

When the precipitation step is performed at an excessively low temperature, primary particles are seldomly produced since the reaction rate between the precipitant and the metal oxide precursor is low. On the other hand, when the precipitation step is performed at an excessively high temperature, it is difficult to control the size of the primary particles since the reaction rate is too high. Further, while an excessively short operating time in the precipitation step causes the size of the primary particles to be small and the crystal growth rate of the primary particles to be low, an excessively long operating time causes the size of the primary particles to be too big.

The calcination step is a step which produces the metal oxide coating layer by oxidizing the metal-containing precipitate produced on the catalyst support. The calcination step may be performed at a temperature of from 500 to 1200° C. under an oxidizing atmosphere. Specifically, a preferable temperature is from 700 to 900° C.

While an excessively low temperature in the calcination step causes crystallization of the metal oxide not to be occurred, an excessively high temperature causes a surface area of the metal oxide coating layer to decrease due to a surface agglomeration phenomenon. The calcination step is performed under an oxidizing atmosphere. Any oxidizing treatment normally has been adopted may be employed.

In the method of the present invention, electrochemical surface treatment and/or heat treatment as disclosed in Patent Literature 1 (Korean Patent No. 10-1019234) may be performed before the precipitation step in order to form a metal oxide layer being an intermediate layer between the catalyst support and the metal oxide coating layer.

The electrochemical surface treatment step is a step which produces an amorphous metal oxide layer on the catalyst support in a solution comprising an electrolyte by controlling a voltage applied to the solution and a concentration of the electrolyte. The heat treatment step is a step which heats the amorphous metal oxide layer in a furnace having an oxidizing atmosphere in order to crystallize the amorphous metal layer on the catalyst support or produce a metal oxide containing a specific component.

The metal oxide layer produced on the catalyst support by the electrochemical surface treatment or heat treatment step exists between the catalyst support and the metal oxide coating layer formed through the precipitation and calcination steps of the present invention, and functions as a layer increasing the binding force between the catalyst support and the metal oxide coating layer.

In the case of the catalyst support on which the metal oxide coating layer is formed according to the present invention, the binding force between the metal oxide coating layer and the catalyst support is relatively high since the catalyst support and the metal oxide coating layer functioning as a catalyst carrier are chemically bonded. Further, the specific surface area of the metal oxide coating layer increases, because the metal oxide coating layer is, as shown in the following Examples, formed on the catalyst support in a configuration in which a plurality of round or needle-shaped particles is closely packed.

EXAMPLE 1

Effect of a Calcination Temperature

In this example, a FeCr alloy foil was used as a catalyst support, and an alumina layer as a metal oxide layer was formed on the FeCr alloy foil by electrochemical surface treatment as disclosed in Patent Literature 1 (Korean Patent No. 10-1019234) and heat treatment at 900° C. for 6 hours.

In order to produce an alumina coating layer as a catalyst carrier on the FeCr alloy foil having the alumina layer, a mixed solution having a pH of 12 and a concentration of 300 mM was made by adding ammonia (NH$_3$) water as a precipitant to a solution consisting of distilled water and aluminum nitrate (Al(NO$_3$)$_3$.9H$_2$O) as a metal oxide precursor.

Aluminum hydroxide such as boehmite, bayerite etc. was produced as a precipitate on the FeCr alloy foil by aging at 90° C. for 14 hours after immersing the foil passed through the aforementioned electrochemical surface treatment and heat treatment steps in the mixed solution.

The alumina coating layer was produced on the FeCr alloy foil by drying the aged foil and, thereafter, calcinating at a high temperature under an oxidizing atmosphere. The calcination temperature was varied by increasing 100° C. in a range of 500 to 900° C. in order to investigate the effect of the calcination temperature, and the calcination was performed during 6 hours at each temperature.

Figure 3:
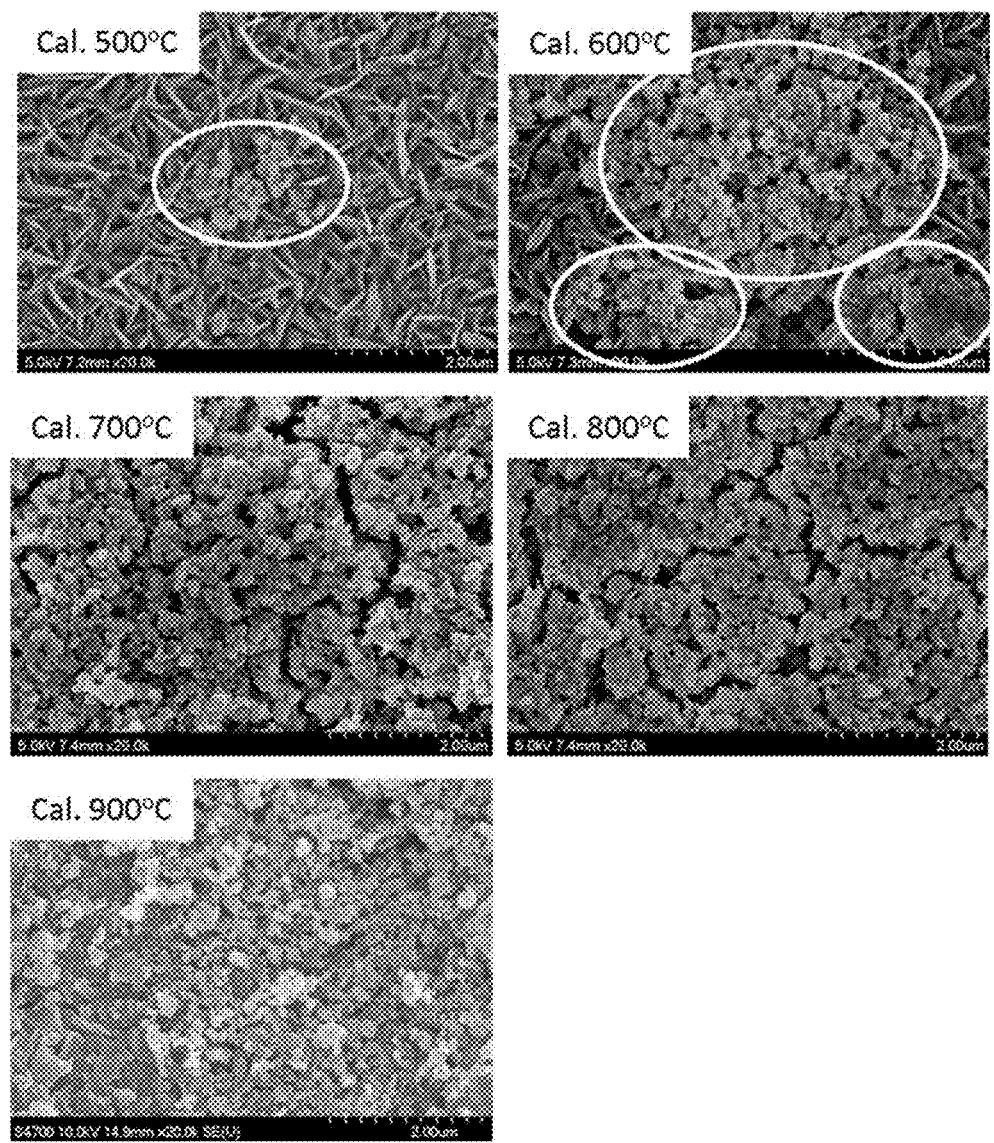
FIG. 3 is SEM photographs showing the effect of a variation of calcination temperatures on the formation of an alumina coating layer.

FIG. 3 is SEM photographs showing the effect of the calcination temperature on the formation of the alumina coating layer.

Referring to FIG. 3, as shown in the circled area, round-shaped alumina particles were partly formed as the alumina coating layer on the catalyst support at a calcination temperature of 500 and 600° C. The higher the calcination temperature, the larger the area of the round-shaped alumina particles formed on the catalyst support in a close-packed formation. We conjecture this is because the grain size and crystallinity of the alumina particles deposited on the catalyst support increase by increasing the calcination temperature. As shown in FIG. 3, the round-shaped alumina particles having the close-packed formation were formed on the almost entire surface of the catalyst support above a calcination temperature of 700° C.

EXAMPLE 2

Effect of a Precipitant

In this example, a FeCr alloy foil was used as a catalyst support, and an alumina layer as a metal oxide layer was formed on the FeCr alloy foil by only heat treatment at 900° C. for 6 hours as disclosed in Patent Literature 1 (Korean Patent No. 10-1019234) without electrochemical surface treatment.

In order to produce an alumina coating layer as a catalyst carrier on the FeCr alloy foil having the alumina layer, a mixed solution having a pH of 3 and a concentration of 300 mM was made by adding urea ($CO(NH_2)_2$) as a precipitant to a solution consisting of distilled water and aluminum nitrate ($Al(NO_3)_3 \cdot 9H_2O$) as a metal oxide precursor.

Aluminum hydroxide was produced as a precipitate on the FeCr alloy foil by aging at 90° C. for 64 hours after immersing the foil passed through the aforementioned heat treatment step in the mixed solution.

The alumina coating layer was produced on the FeCr alloy foil by drying the aged foil and, thereafter, calcinating at 900° C. under an oxidizing atmosphere.

Figure 4:
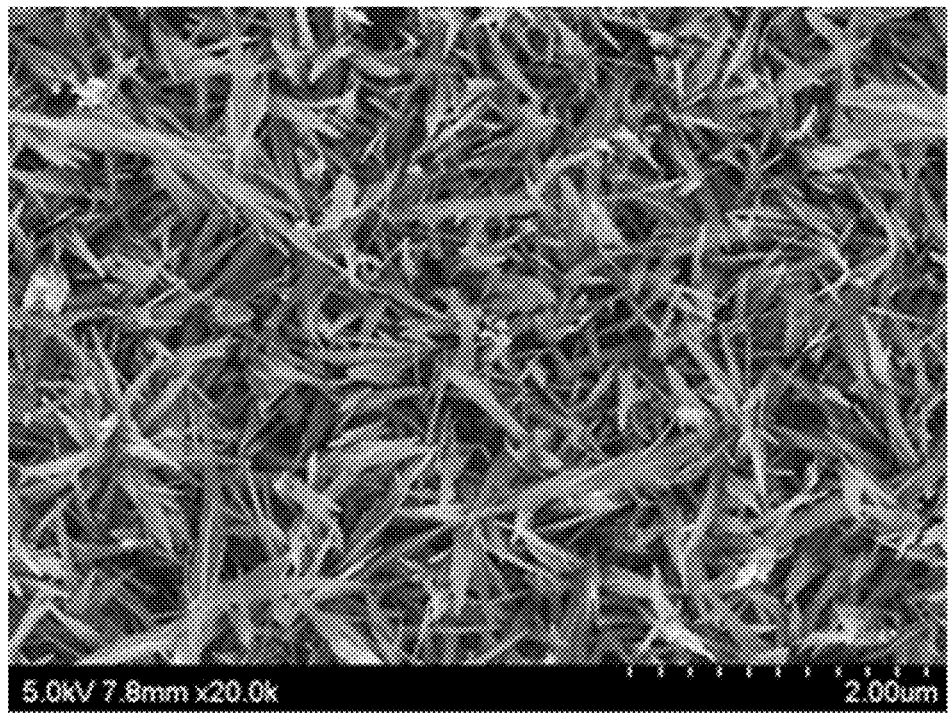
FIG. 4 is SEM photographs showing an alumina coating layer formed using urea as a precipitant.
Figure 4:
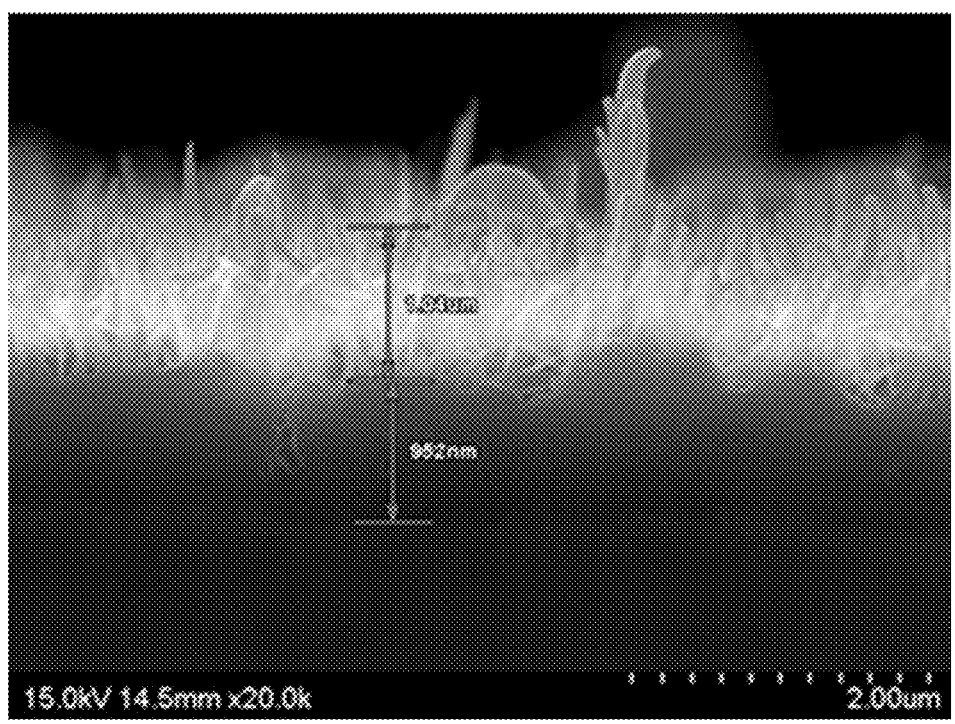

FIG. 4 is SEM photographs showing the surface and the cross-section of the alumina coating layer formed using the urea as a precipitant.

Referring to FIG. 4, in the case of using the urea as a precipitant, a plurality of needle-shaped alumina particles having a close-packed formation was abundantly and uniformly formed as an alumina coating layer on the catalyst support, while, in the case of using the ammonia water as a precipitant, a plurality of round-shaped alumina particles having the close-packed formation was formed as an alumina coating layer on the catalyst support as shown in FIG. 3. We conjecture such an alumina coating layer of the needle-shaped, nano alumina particles abundantly and uniformly deposited on the catalyst support makes it possible not only to highly and dispersedly carry an active metal catalyst by providing a large specific surface area, but also to increase durability of an catalyst reactor by highly stable bonding between the catalyst and the catalyst support.

Figure 5:
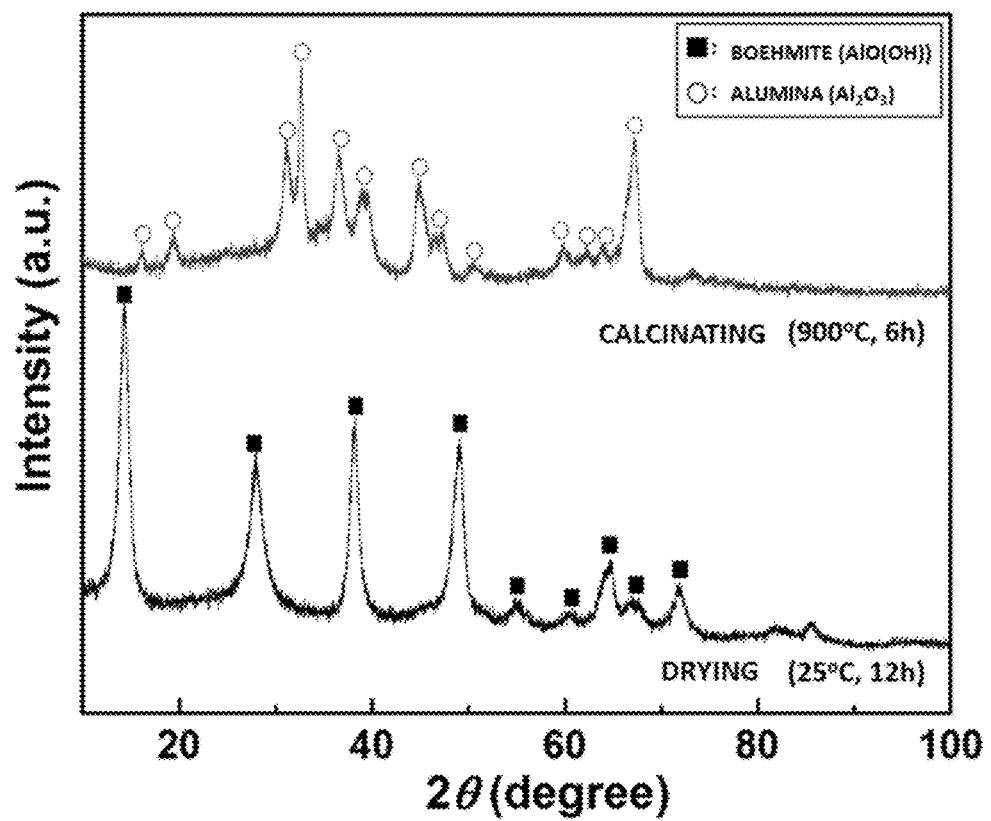
FIG. 5 shows the XRD analysis of specimens with and without a calcination step.

FIG. 5 shows the XRD analysis of specimens with and without the calcination step.

Referring to FIG. 5, the black graph represents the XRD analysis of a specimen which is subjected to only drying, after the precipitation step producing a precipitate by immersing the FeCr alloy foil passed through the electrochemical surface treatment and heat treatment steps in the mixed solution. The red graph represents the XRD analysis of a specimen which is subjected to drying and calcinating at 900° C. for 6 hours, after the precipitation step producing a precipitate by immersing the FeCr alloy foil passed through the electrochemical surface treatment and heat treatment steps in the mixed solution.

As shown in FIG. 5, when the specimen is subjected to only drying after the precipitation step, only boehmite is formed on the catalyst support. Meanwhile, when the specimen is subjected to drying and calcinating after the precipitation step, an alumina layer is formed on the catalyst support.

COMPARATIVE EXAMPLE 1

Washcoating in an Alumina Sol Solution after Electrochemical Surface Treatment and Heat Treatment In this comparative example, a FeCr alloy foil was used as a catalyst support, and an alumina layer as a metal oxide layer was formed on the FeCr alloy foil by electrochemical surface treatment and heat treatment at 900° C. for 6 hours as disclosed in Patent Literature 1 (Korean Patent No. 10-1019234).

In order to produce an alumina coating layer as a catalyst carrier on the said FeCr alloy foil, the FeCr alloy foil was subjected to washcoating in a 10 wt % alumina sol solution obtained using boehmite (AlO(OH)).

The alumina coating layer was produced on the FeCr alloy foil by drying the washcoated foil and, thereafter calcinating at 900° C. for 6 hours after the washcoating.

Figure 6:
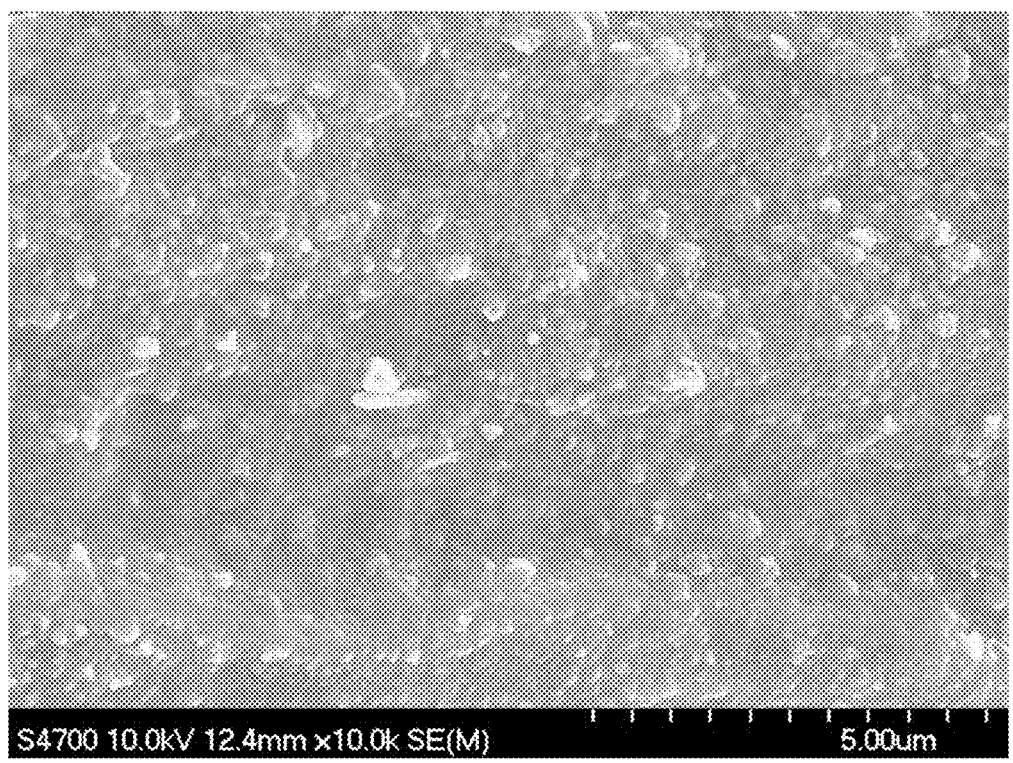
FIG. 6 is an SEM photograph showing a metal oxide coating layer produced by washcoating after electrochemical surface treatment and heat treatment.

FIG. 6 is an SEM photograph showing the metal oxide coating layer obtained by the washcoating after the electrochemical surface treatment and heat treatment.

COMPARATIVE EXAMPLE 2

Washcoating in an Alumina Sol Solution after Heat Treatment

In this comparative example, a FeCr alloy foil was used as a catalyst support, and an alumina layer as a metal oxide layer was formed on the FeCr alloy foil by only heat treatment at 900° C. for 6 hours as disclosed in Patent Literature 1 (Korean Patent No. 10-1019234) without electrochemical surface treatment.

In order to produce an alumina coating layer as a catalyst carrier on the said FeCr alloy foil, the FeCr alloy foil was subjected to washcoating in a 10 wt % alumina sol solution obtained using boehmite (AlO(OH)).

The alumina coating layer was produced on the FeCr alloy foil by drying the washcoated foil and, thereafter calcinating at 900° C. under an oxidizing atmosphere.

Figure 7:
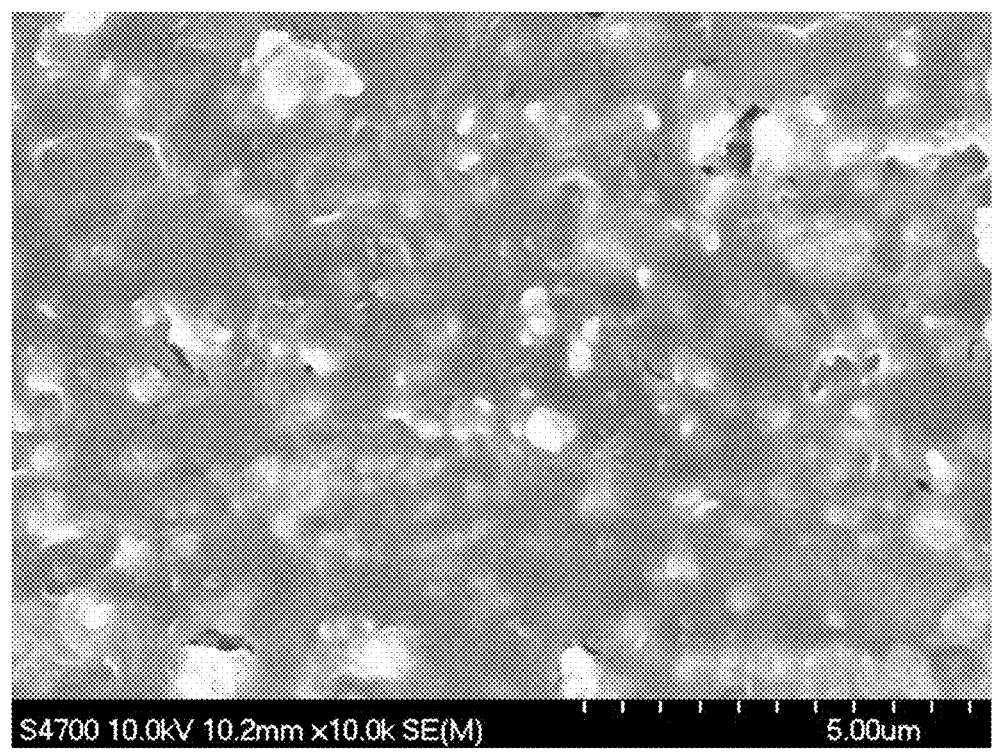
FIG. 7 is an SEM photograph showing a metal oxide coating layer produced by washcoating after heat treatment.

FIG. 7 is an SEM photograph showing the metal oxide coating layer obtained by the washcoating after the heat treatment.

Referring to FIGS. 3 to 7, the metal oxide coating layers produced by the present invention have a close-packed formation of a plurality of round-shaped metal oxide particles as shown in FIG. 3, or a close-packed formation of a plurality of needle-shaped metal oxide particles as shown in FIG. 4. These close-packed formations have a large specific surface area. On the other hand, the metal oxide coating layers produced by the washcoating are irregularly formed on the catalyst support as shown in FIGS. 6 and 7, and, therefore, their specific surface area is relatively small. As a result, when using the metal oxide coating layers produced by the present invention as catalyst carrier, they can provide improved catalytic activity due to a relatively large specific surface area, comparing with the metal oxide coating layers produced by the washcoating.

Also, the metal oxide coating layers produced by the present invention can improve the durability of catalysts since a strong chemical bonding between the metal oxide coating and the catalyst support is obtained by precipitating and calcinating, comparing with the metal oxide coating layers produced by the washcoating.

According to the present invention, a metal oxide coating layer as a catalyst carrier is formed on a catalyst support so that the binding force between the metal oxide coating layer and the catalyst support, and the specific surface area of the metal oxide coating layer are increased.

The effects of the present invention are not limited to the above effects. It should be understood that the present invention includes other effects which may be conjectured from the following description and claimed inventions.

In the foregoing specification, specific embodiments of the present invention have been described. However, one of ordinary skill in the art appreciates that various modifications can be made without changing the concept or essential features of the present invention. Accordingly, the foregoing embodiments are to be regarded in an illustrative rather than a restrictive sense. For example, while the elements explained in a single form may be separately embodied, the elements explained separately may be combinedly embodied.

The scope of the present invention is defined by the appended claims and includes any other modifications and changes derived from those claims and their equivalents.

What is claimed is:

1. A method for forming a metal oxide coating layer on a catalyst support, the method comprising the steps of:
    performing a treatment on the catalyst support to produce an amorphous metal oxide layer including aluminum on the catalyst support, treatment consisting of performing electrochemical surface treatment on the catalyst support or heat treatment on the catalyst support;
    precipitating a metal-containing precipitate on the treated catalyst support by contacting the treated catalyst support with a mixed solution containing a metal oxide precursor including aluminum and a precipitant; and
    calcinating the metal-containing precipitate formed on the treated catalyst support to form a metal oxide coating layer of alumina on the catalyst support,
    wherein the method excludes washcoating, and
    wherein the metal oxide coating layer of alumina is formed in a structure in which a plurality of round or needle-shaped particles is packed together.

2. The method of claim 1, wherein the metal-containing precipitate is boehmite (AlO(OH)) or bayerite (Al(OH)$_3$).

3. The method of claim 1, wherein the metal oxide precursor is at least one selected from the group consisting of aluminum nitrate (Al(NO$_3$)$_3$.9H$_2$O), aluminum chloride (AlCl$_3$.6H$_2$O), and aluminum acetate (C$_2$H$_5$AlO$_4$).

4. The method of claim 1, wherein the precipitant is at least one of ammonia (NH$_3$) and urea (CO(NH$_2$)$_2$).

5. The method of claim 1, wherein the metal oxide precursor in the mixed solution has a concentration ranging from 50 to 2000 mM.

6. The method of claim 1, wherein the mixed solution has a pH ranging from 3 to 12.

7. The method of claim 1, wherein the precipitating step is performed at a temperature of 25 to 200° C. for 0.5 to 100 hours.

8. The method of claim 7, wherein the precipitating step is performed at a temperature of 60 to 90° C. for 5 to 70 hours.

9. The method of claim 1, wherein the calcination step is performed at a temperature of 500 to 1200° C. under an oxidizing atmosphere.

10. The method of claim 9, wherein the calcinating step is preferably performed at a temperature of 700 to 900° C. under an oxidizing atmosphere.

11. The method of claim 1, wherein the catalyst support is made from a material selected from the group consisting of stainless steel, a FeCr alloy, aluminum, titanium, and SiC, or an alloy made from two or more materials selected from the group.

12. The method of claim 1, wherein the catalyst support is fabricated in a form of felt, mat, mesh, foam, foil, monolith, or pin.

13. A method for forming a metal oxide coating layer on a catalyst support, the method comprising the steps of:
    performing a treatment on the catalyst support to produce an amorphous metal oxide layer including aluminum on the catalyst support, the treatment consisting of performing electrochemical surface treatment on the catalyst support or heat treatment on the catalyst support;
    precipitating a metal-containing precipitate on the treated catalyst support by contacting the treated catalyst support with a mixed solution containing a metal oxide precursor including aluminum and a precipitant; and
    calcinating the metal-containing precipitate formed on the treated catalyst support to form a metal oxide coating layer of alumina on the catalyst support,
    and
    wherein the metal oxide coating layer of alumina is formed in a structure in which a plurality of round or needle-shaped particles is packed together.

14. The method of claim 1, wherein only electrochemical surface treatment for the catalyst support is performed.

15. The method of claim 1, wherein only heat treatment for the catalyst support is performed.

* * * * *